May 3, 1966  S. W. WILCOX  3,249,297
VOTING MACHINE

Filed July 13, 1964  13 Sheets-Sheet 1

INVENTOR.
STANLEY W. WILCOX

BY

*Head & Johnson*

ATTORNEYS

May 3, 1966 S. W. WILCOX 3,249,297
VOTING MACHINE

Filed July 13, 1964 13 Sheets-Sheet 2

INVENTOR.
STANLEY W. WILCOX
BY
Head & Johnson
ATTORNEYS

May 3, 1966   S. W. WILCOX   3,249,297
VOTING MACHINE
Filed July 13, 1964   13 Sheets-Sheet 3

INVENTOR.
STANLEY W. WILCOX
BY
Head & Johnson
ATTORNEYS

May 3, 1966 S. W. WILCOX 3,249,297
VOTING MACHINE
Filed July 13, 1964 13 Sheets-Sheet 5

INVENTOR.
STANLEY W. WILCOX
BY
Head & Johnson
ATTORNEYS

May 3, 1966   S. W. WILCOX   3,249,297
VOTING MACHINE
Filed July 13, 1964   13 Sheets-Sheet 6

INVENTOR.
STANLEY W. WILCOX
BY
Head & Johnson
ATTORNEYS

May 3, 1966  S. W. WILCOX  3,249,297
VOTING MACHINE
Filed July 13, 1964  13 Sheets-Sheet 7

INVENTOR.
STANLEY W. WILCOX
BY
Head & Johnson
ATTORNEYS

INVENTOR.
STANLEY W. WILCOX
BY Head & Johnson
ATTORNEYS

INVENTOR.
STANLEY W. WILCOX

BY Head & Johnson

ATTORNEYS

May 3, 1966 S. W. WILCOX 3,249,297
VOTING MACHINE
Filed July 13, 1964 13 Sheets-Sheet 11

INVENTOR.
STANLEY W. WILCOX
BY Head & Johnson
ATTORNEYS

May 3, 1966    S. W. WILCOX    3,249,297
VOTING MACHINE
Filed July 13, 1964    13 Sheets-Sheet 13

VOTE REGISTERING CYCLE

BALLOT CASE RESTORING CYCLE

INVENTOR.
STANLEY W. WILCOX
BY Head & Johnson
ATTORNEYS

United States Patent Office 3,249,297
Patented May 3, 1966

3,249,297
VOTING MACHINE
Stanley W. Wilcox, Tulsa, Okla., assignor of one-half to Head & Johnson, Tulsa, Okla., a partnership
Filed July 13, 1964, Ser. No. 382,232
15 Claims. (Cl. 235—54)

This invention relates to an improved voting system and apparatus for use in conjunction therewith. More particularly, this invention relates to a plurality of selecting devices or ballots to accommodate several voters at the same time, whoes selections are tallied by a common registering means, and wherein the registering means restores the ballot for reuse. Further this invention relates to a reusable ballot which resembles a common paper ballot in format and which incorporates all the features common to conventional voting machines, including the protections and safeguards required by law.

The fact that the process of voting is always a one day affair within certain prescribed hours causes heretofore existing single-voter-use voting machines to become inefficient in their ability to handle voter traffic, especially during the off working hours. As a result long waiting lines occur at certain periods on election days with unfavorable voter reaction.

The substantial capital investment in the heretofore known and used voting machines makes it an economical hardship to accommodate the voters efficiently in most metropolitan precincts. Furthermore, the cost of transporting the heretofore used machine to the precincts because of their great weight and bulk is expensive in addition to their storage costs between elections. In many instances the size and weight of the heretofore used machines has limited their use, especially where private residences are used as polling places. Also their size and complexity tends to slow the programing of same and further provides a complicated and formidable presentation to the voter when compared with the usual type of paper ballot.

Accordingly, it is a primary object of this invention to provide an improved voting apparatus which overcomes the problems of heretofore known voting machines.

A primary object of this invention is to provide an improved voting apparatus which combines the desirable features of both the paper ballot and those achieved by voting machines.

Another object of this invention is to provide an improved ballot display having the simplicity of a paper ballot which uses a movable selection indicating means instead of the nonirradicable marking device as used with paper ballots and which permits the voter to change his mind without spoiling the ballot previous to making his final selections.

A yet further object of this invention is to provide an improved voting apparatus in which precinct officials are able to present to the voter only those ballots for which he is entitled to use legally, and no other.

A still further object of this invention is to provide an improved voting apparatus which permits the physical separation of the voter's selection from the vote registering and recording means. Further, the apparatus of this invention permits a plurality of voter ballot selection devices which can be serviced by a common vote registering device.

A still yet further object of this invention is to provide an improved voting apparatus which includes the versatility and the capacity to handle any election. That is, this invention is capable of handling elections wherein various issues, propositions, and/or offices may be combined into long ballots incident to a primary and general election at local, state, and/or national levels.

And even still a further object of this invention is to provide an improved voting apparatus which will comply with the varying legal requirements of the various political subdivisions.

These and other objects of this invention will become more apparent upon further reading of the specification and claims when taken into conjunction with the following illustrations of which:

*Detailed description*

Figure 1:
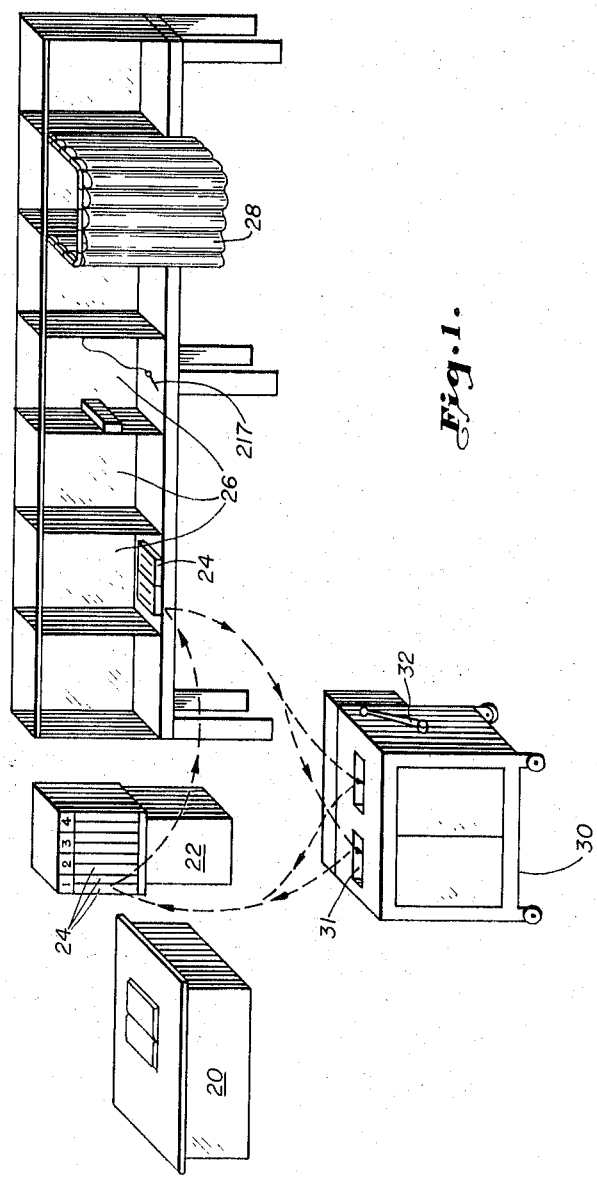
FIGURE 1 is a general schematic layout of a typical precinct installation using the voting apparatus of this invention.

Referring now to FIGURE 1 the general schematic of the apparatus of this invention is illustrated for a typical precinct. The numeral 20 generally refers to a voter certification desk where precinct officials receive and certify duly qualified voters. Ballot storage case 22 is adapted to store a multiplicity of ballot cases or frames 24. If the type of election so requires the case 22 may be divided into separate catagories, such as Republican, Democrat, etc., or by political sub-division such as State, local and national, etc. A multiplicity of voting booths 26 are provided for the voter and will usually include a curtain screen 28 for each. Each voting booth will be adapted to receive the voter and his assigned ballot case or cases as required. A vote registering console 30 is adapted to receive one or more ballot cases 24 within cavities 31 wherein the voters selections are converted to tallied votes by operation of a vote registering lever 32 and which further restores the ballot case 24 for further use by another voter after being returned to the storage case 22.

The equipment illustrated in the schematic layout of FIGURE 1 has voter accommodation capacity equivalent to the same number of conventional machines as there are voting booths provided, of course, there are adequate ballot cases 24 provided. The capacity of the system of this invention is only limited by the ability of the precinct officials to handle the voter traffic. Nor is there any time pressure upon the voter in the making of his preferences and selections.

*Ballot case*

Figure 2:
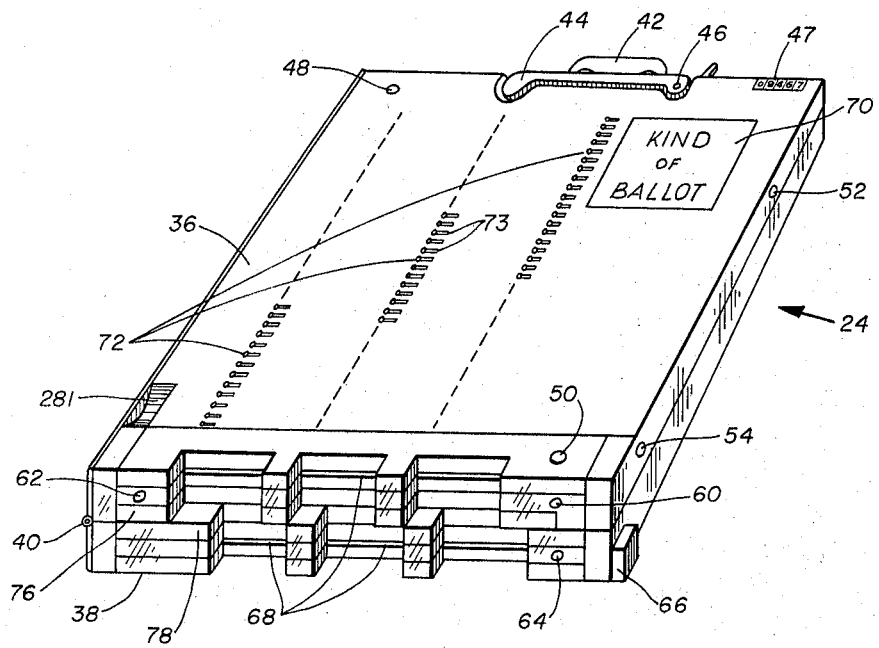
FIGURE 2 is a perspective view of a ballot case in closed position.

Referring now to FIGURE 2, the ballot case 24 of this invention is shown in its closed and locked position, which is the position normally received by the voter prior to use. As shown, the case comprises left and right frames 36 and 38 respectively, connected by hinge 40. Handle 42 is preferably attached to the right frame 38 for carrying the ballot case 24 to the voting booths to the vote registering console, and to the storage case provided.

Ballot case opening lever 44 is adapted to pivot outwardly from the upper or left case 36 by a pivotal movement about shaft 46. This movement by the voter operates to: (1) unlock the two halves of the ballot case; (2) place the selection indicator keys in position for use by the voter, as is hereinafter described in greater detail; and (3) actuates a serial counter 47 one digit.

Openings 48 and 50 are adapted to cooperate with alignment pins within the vote registering console 30 as hereinafter described. Selection indicator key restoration openings 52 and 54 are provided for left frame 36 on one side and likewise identical restoration openings 56 and 58 are provided for the other frame 38 on the opposite side, not in view. Opening 60 permits restoration action to the ballot case opening lever. Openings 62 and 64 in the ballot case halves 36 and 38 permit restoration of the one party voting mechanism. An orientation and precoded registering device 66 of desired shapes or configurations is attached to the ballot case primarily for the purpose of properly positioning the ballot case 24 within a matching receiver of the vote registering console 30. This assures that the programing of the ballot case is matched with that of its console. This takes care of those instances where ballot name rotation is required by law.

A plurality of write-in card insertion slots 68, one for each ballot column are provided in each half of the ballot case 24, the use of which is hereafter described.

In some instances it may be preferable to have an identification label 70 to properly identify the type of ballot or ballots enclosed within the ballot case 24, or in some instances the cases 24 may be color coded. In some instances it may be desirable to have a permanent identification serial number, not shown. A multiplicity of columnar vote registering sampling openings 72 are provided in each half of the ballot case to receive cooperating registering pins within the vote registering console 30 which sense the position of the voter selection indicators.

Figure 3:
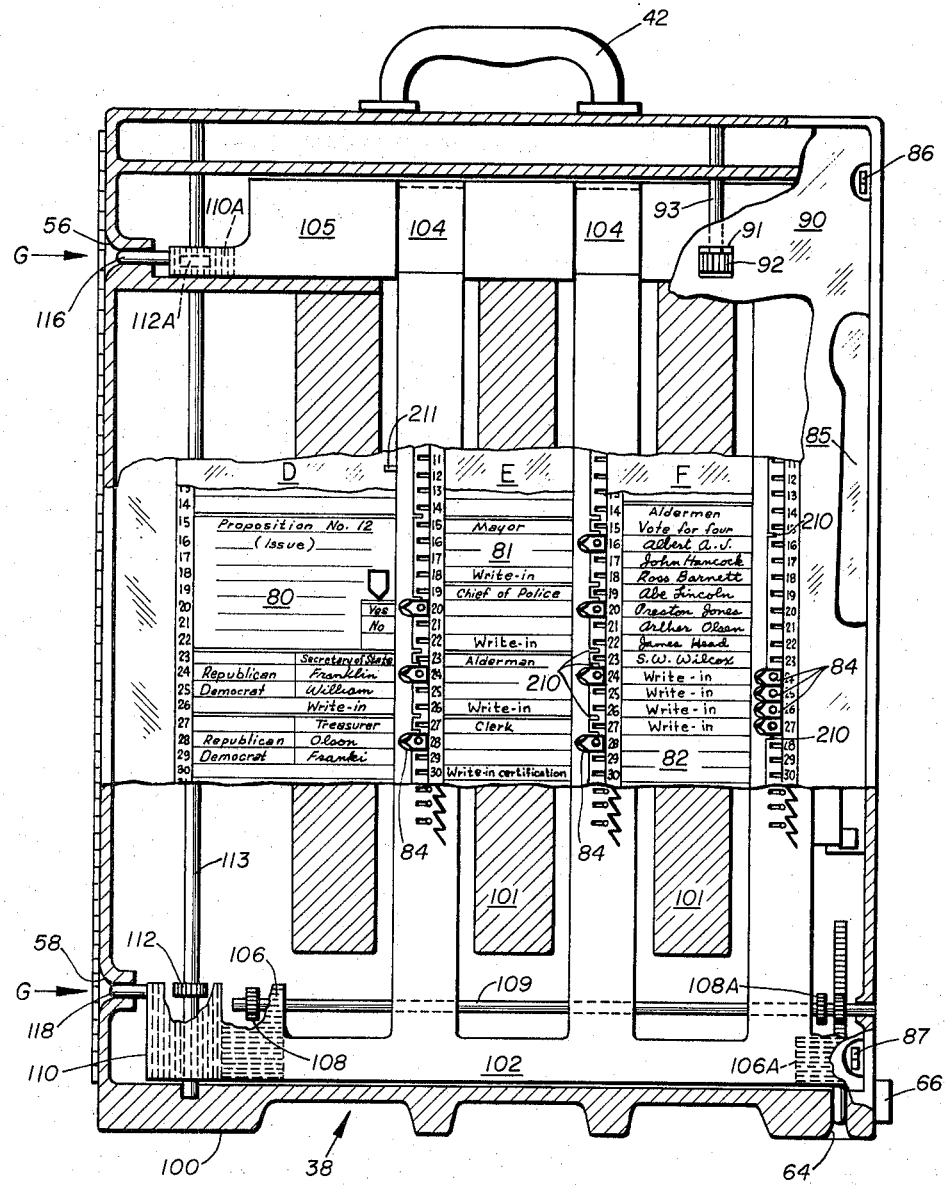
FIGURES 3 and 4 are detailed, illustrations, partly sectioned and broken away showing the details of the ballot case halves of this invention, in their open position.

Referring now specifically to FIGURE 3, which partially describes the appearance of the right half of case 38 after it has been opened by the voter and typical ballot programing usages. As shown, the ballot case comprises a multiplicity of vertical column slots, preferably three or four. These can be alphabetically designated or otherwise identified. In some instances, it may be desirable to make a wide column D for the purpose of permitting the presentation of lengthy ballot issues or propositions. In this view column D includes a ballot 80, column E, ballot 81, and column F, ballot 82, which are typical of the voting situations encountered in most States or political sub-divisions. Typically, the vertical columns of the ballot display are horizontally divided into rows and numerically identified e.g., rows 14 through 30 being shown in this view. This identification to assist in write-in voting and to match the vote registering tally counters, later described.

A suitable number of selection indicators or keys 84 are provided for movement in appropriate channels adjacent each ballot column. Ballot frame end portions 76 and 78 (FIGURE 2) are adapted to be removable for inserting the ballot programs. A one or straight party voting lever cover 86 is provided in that instance the lever is not permitted by law or is not necessary.

Locking lugs 86 and 87 are provided with one half of the ballot case for mating and cooperation with locking slots in the other ballot case half 36, hereafter identified as 88 and 89.

The ballot column members are suitably attached to a frame 100 into which a selection indicator control grid 102 is adapted for movement into 90° directions in the same plane. For reference purposes when referring to FIGURES 3 and 4 this movement will be described as in the vertical and horizontal direction. The vertical movement of the grid generally is used for straight party voting control of the selection indicators whereas the horizontal movement is utilized to control the selection indicators 84 into one of three sequential positions, which will be referred to herein as:

(I) The free or neutral position,
(II) The voter selecting position, and
(III) The locked, vote registering position.

Figure 4:
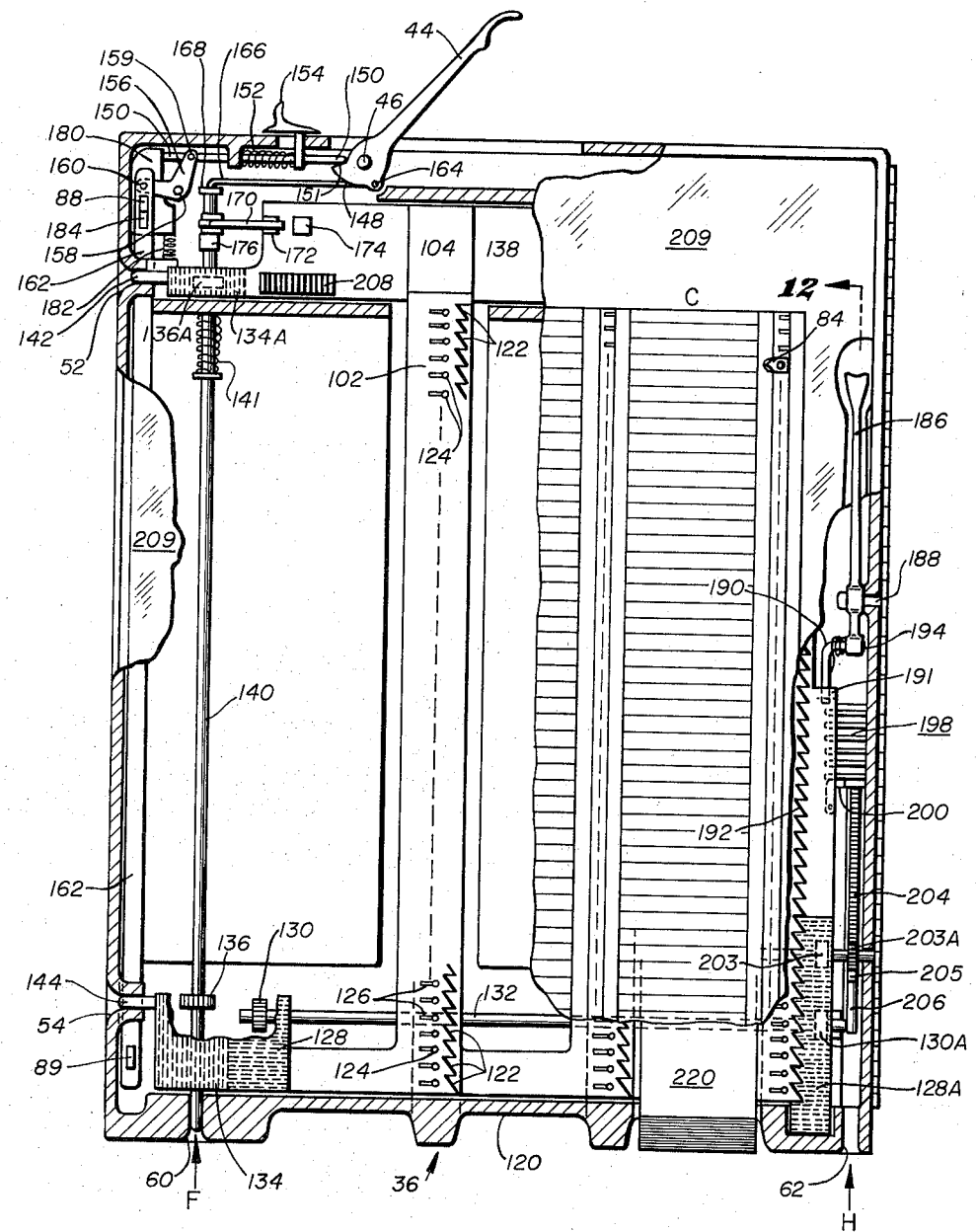

The detailed elements of grid 102 is more amply shown in FIGURE 4 and other views. Vertical grooves 104 are provided at the upper end of a header 105 to permit the vertical displacement of grid 102. Header 105 is a separate member and is the upper complement to rack and pinion movement 110A and 112A of grid 102 in the horizontal direction only. Cooperating rack and pinion systems 106 and 108, 110 and 112 and their complements 106A, 108A and 110A and 112A provide properly aligned motion of the grid in the two directions. The rack teeth 106, 106A and 110 and 110A are preferably molded as a unit on the bottom side of grid 102. Intermediate the grid movement are a plurality of island members 101 which are a part of the ballot case 100. Shaft 109 with attached gears 108 and 108A are adapted to drive the grid 102 in its vertical movement. Likewise, shaft 113 is adapted through its attached gears 112 and 112A to move grid 102 in its horizontal movement.

Grid restoration pins 116 and 118 are adapted for movement within restoration openings 56 and 58 to move header 105 and grid 102 in that horizontal direction opposite to that performed by rack and pinion system 110–112 and 110A–112A, which is derived from the opening and closing of the ballot case 24, more fully described hereinafter. That is, movement of the grid restoration pins 116 and 118, usually within the vote registering console sequencing hereafter described, reposition the grid 102 to the I-neutral position. Whereas the unlatching or opening of the ballot case 24 will move the grid to the II-position while closing or locking of the case will move the grid to position III.

A top ballot cover 90 includes appropriate slots to receive ballots 80, 81 and 82 and usually covers the internal mechanisms. A window 91 exposes the top edge of a spur gear 92 which meshes with a rack gear attached to header 105. The gear 92 is supported upon shaft 93 which is supported in frame 100.

In FIGURE 4 the other or left half of ballot case 24 is described and includes a frame 120 which is substantially identical to frame 100 of the right side or interchangeable as desired. Grid 102, which is shown in greater detail, is similarly constructed to that shown in FIGURE 3 and in this instance is described to show a multiplicity of selection indicator locking teeth 122 which cooperates with the selection indicator keys 84 in the previously described positions. A multiplicity of vertically aligned openings 124 are provided for the vote registering console sensing pins hereinafter described. Adjacent thereto for each sampling hole position are a multiplicity of magnetic detents 126, which are soft iron plugs in a nonmagnetic grid 102.

Similar to that shown in FIGURE 3 is a rack and pinion system 128 and 130 with complements 128A and 130A which provides the vertical motion of grid 102. Pinions 130 and 130A are attached to common shaft 132. Rack and pinion system 134 and 136 and complements 134A and 136A for movement of header 138. Pinions 136 and 136A are attached to common shaft 140 to control the horizontal movement of grid 102 and header 138 respectively and more fully described hereinafter. Similar to the right half of ballot case 24 restoration pins 142 and 144 are adapted for movement within openings 52 and 54 respectively to shift grid 102.

Opening and closing lever 44 is adapted for pivotal movement about shaft 46. Cam surface 148 thereon is adapted for movement with respect to follower pin 150 which is biased normally against the cam surface 148 by reason of spring 152. A finger release mechanism 154 is formed as a part of the follower 150 and moves therewith. At the end of follower 150 is a bell crank member 156 which is pivotal about fixed point 158. One link of the crank is pivotally attached at 159 to follower pin 150. The other end of lever 156 is pivotally attached at 160 to the ballot case locking bar 162. Locking slots 88 and 89 are formed as a part of the locking bar 162. Pivotally attached at 164 to handle 44 is a linkage rod 166 which is adapted by a crank arm arrangement 168 to cause pawl 170 to engage with teeth 172 and 174. The crank mechanism 168 and pawl 170 includes a bushing 176 within which shaft 140 is adapted to rotate freely. Spring 141 normally biases shaft 140 in a downward direction to maintain pawl 170 aligned with teeth 172 and 174. Interference element 180 is normally biased upward by spring 182 within an appropriate groove in case 120. The interference element includes a boss 184 which is adapted for movement under slot 88 of locking bar 162.

Party voting lever 186 is adapted for pivotal movement in a vertical direction about shaft 188. The lever is adapted to act as a crank to provide vertical movement of spring pivoted linkage 190 which in turn is attached to pawl 192 by pin 194 (see FIGURES 12A and 12B). The upper end of the pawl 192 engages tooth 191 which is formed as a part of grid 102. Suitable detent grooves 198 are provided as a part of case 120 and are adapted to cooperate with a mating detent device 200 which is attached to grid 102.

A gear 130A is attached to shaft 132 for movement therewith and is engaged with a rack gear 128A of grid 102. Pinion 203 transfers the linear grid motion to restoring rack 204. Rack abutment 205 includes restoring pin 206 which operates in opening 62.

A rack gear 208 is provided as a part of header 138 which extends through the ballot cover 209 for meshing with mating gear 92 of ballot case half 38 when closed together.

Figure 5:
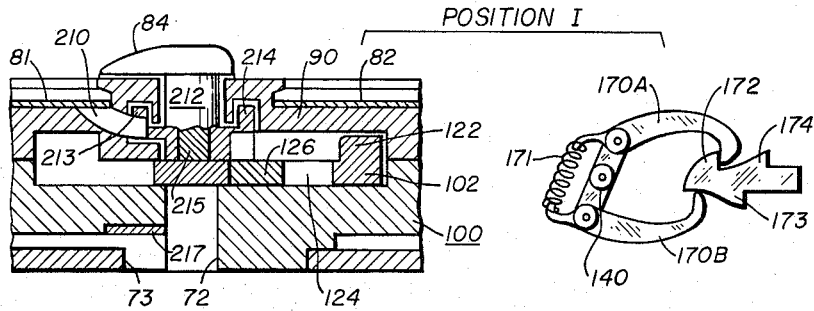
FIGURES 5, 6 and 7 are partial sectional views describing the three operational positions of the ballot case selection indicator control mechanisms as used in FIGURES 3 and 4.
Figure 6:
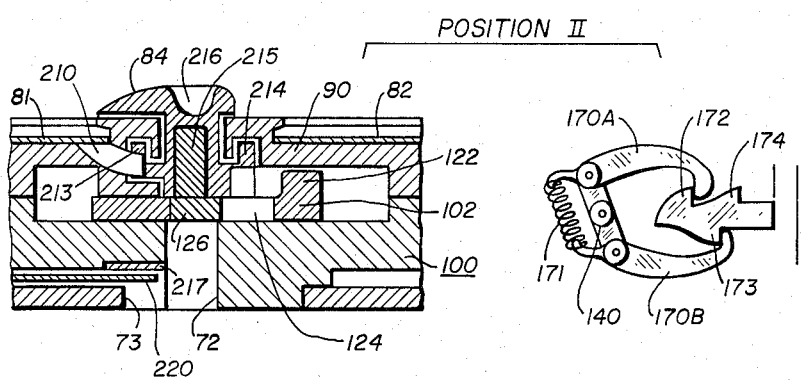
Figure 7:
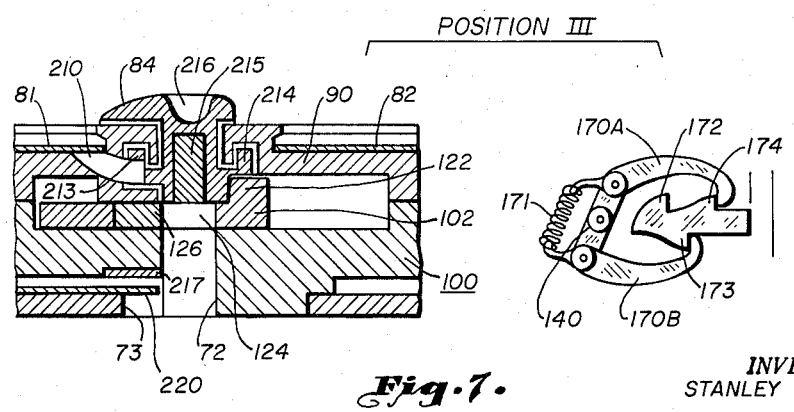

FIGURES 5, 6 and 7 are partial sectional views of the ballot case 36 describing the relationship of the control grid 102 and selection indicator keys 84 in the respective I, II and III positions. Keys 84 include a body portion 212 with wings 213 and 214 which travel in matching grooves of the ballot cover 90. Selector key stops 210 are positioned in exposed slots of the cover 90 when the ballot is removed from its channel and act to divide the ballot into the necessary ballot titles, e.g. mayor, governor, etc. and further act to confine the prescribed selector keys thereto. A magnet 215 is embedded within the body 212 adjacent control grid 102. A voter selector rod or stylus opening 216 is provided in each indicator key 84 for a selector rod or pick 217 provided in the voting booth (see FIGURE 1). Pick 217 may have a pencil on the other end for write-in voting. A write-in ballot marker 316 is provided adjacent the write-in card slot 68. This marker can be an ink stamp or means to cause an impression or indentation upon a write-in ballot 220 during the vote registering cycle.

Figure 8:
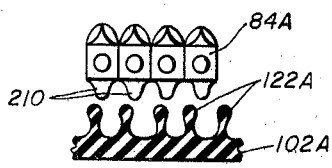
FIGURES 8, 9 and 10 are diagrammatic views of an alternate selection indicator control mechanism in the various operational positions.
Figure 9:
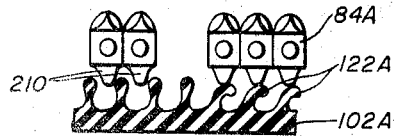
Figure 10:
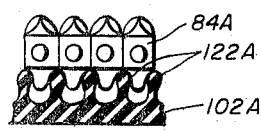

Referring now to FIGURES 8, 9 and 10 a modified form of detenting means for the selector indicators is described in the respective I, II and III positions. In this modification as shown, special detention and locking grid 102A includes a multiplicity of flexible locking teeth 122A which serve as both locking and detenting devices substituting for the locking teeth 122 and magnetic detent devices 126 of FIGURES 3 through 7. In FIGURE 9 the top sectional view describes the voter selection position (II) of the grid 102A and detent elements 122A with respect to selection indicators 84A some of the selection indicators of which are shown being moved to the next detented position, while others are in selected position. In FIGURE 10 relative transverse movement has occurred between the selection indicators 84 and the grid 102A such that the locking fingers 122A now prevent any movement of the selection indicators 84 or position III heretofore described. The selection indicator, detention and locking means as shown in FIGURES 8, 9 and 10 is somewhat diagrammatic as a similar grid 102A having detention and locking teeth thereon may be appropriately positioned on the other side of selection indicators 84 to provide balanced movement of the selection indicators. In some instances it may be desirable to provide detent devices whereby the force required to move a selection indicator is vectorially balanced by the forces opposing the motion.

Figure 11:
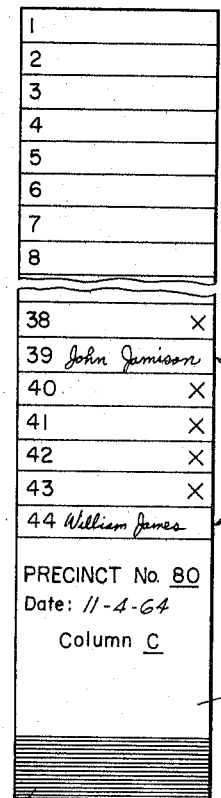
FIGURE 11 is a frontal elevation view partly broken away of a typical write-in vote card for use with this invention.

FIGURE 11 describes a typical write-in ballot card 220 for use with the ballot frame 24 of this invention in those political subdivisions or States that permit such voting by law. Generally, the card is of length substantially equal to the vertical length of the programed ballot with additional grip length 221. When inserted in slot 68 the card will not protrude from the end of the case. The card is imprinted with vertical row numbers corresponding to those on the ballot. Preferably each of the ballot cards 220 are stamped with the precinct number, the date of the election and the ballot column used therewith. Space is provided for the voter to write in the desired names.

Figure 12A:
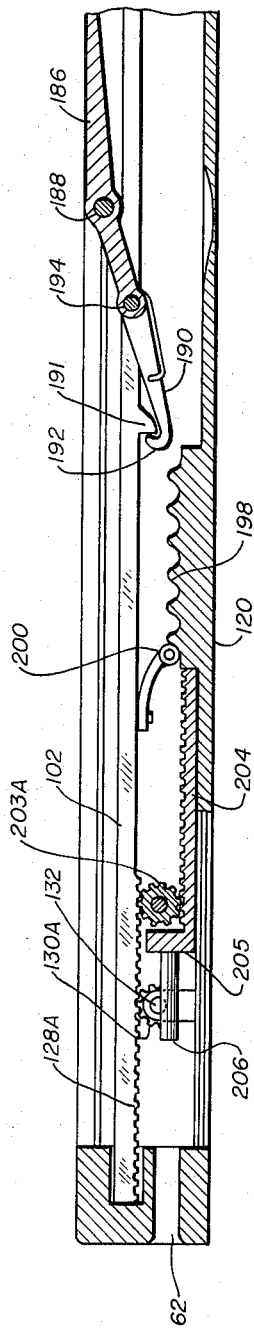
FIGURES 12A and 12B are sectional views taken along the line 12—12 of FIGURE 4 describing the straight ticket or party vote mechanism in its normal and extreme positions respectively.
Figure 12B:
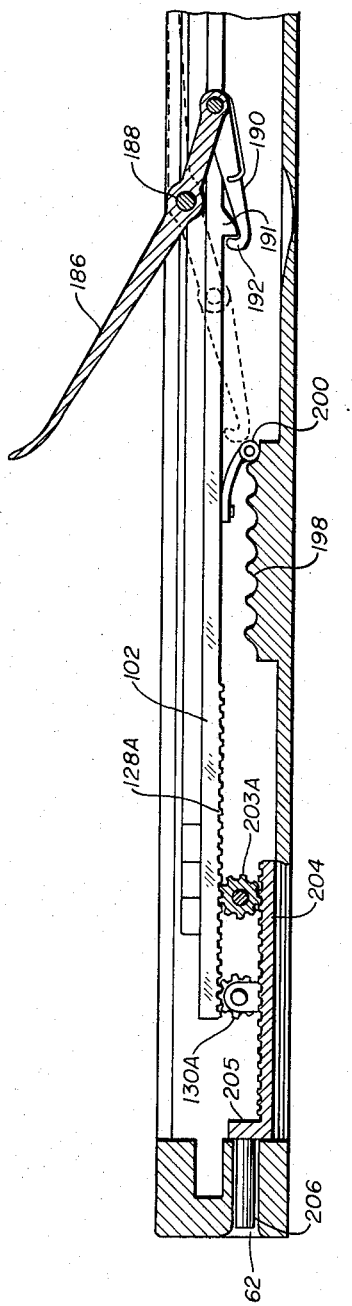

The sectional views of FIGURES 12A and 12B described the party vote mechanism. Party vote lever 186 is hinged about pin 188 and is normally flush with the top surface of ballot frame 120. Linkage 190 is pivotal and spring loaded about the end of lever 186 so as to bear upward against grid 102. The end of linkage 190 is formed as a hook 192 to cooperatively engage with a lug 191 on the grid. Spur gear 203 on shaft 132 engages with restoring rack element 204. Detent rollers 200 are attached to the grid 102 to cooperate with detent grooves 198.

Vote registering console

Figure 13:
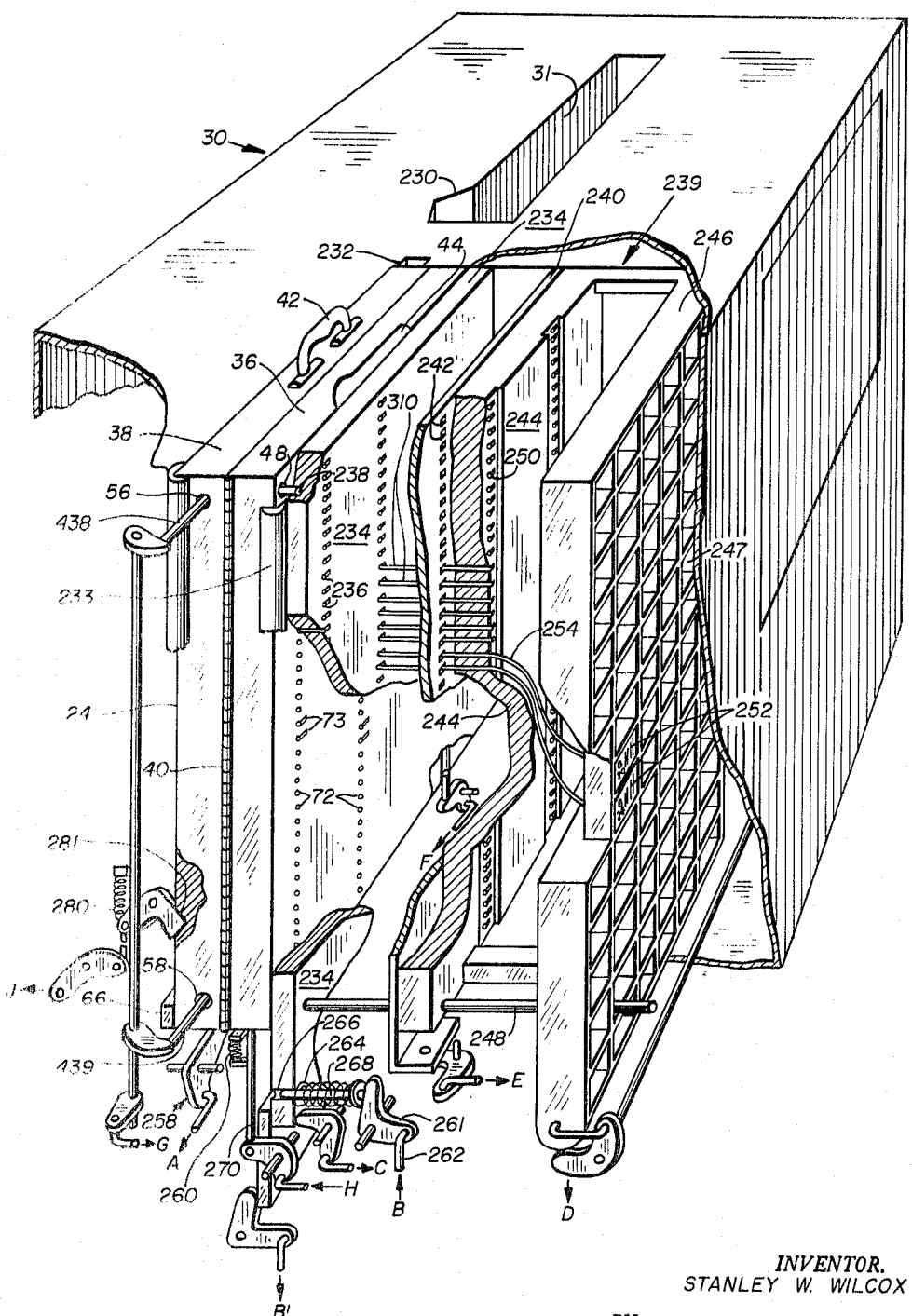
FIGURE 13 is a partial perspective sectional view of the basic operational components of the vote registering console of this invention for one-half of a ballot case.

Referring now to FIGURE 13 the console 30 is shown as included having at least one and preferably two or more, as shown, ballot case receiving cavities 31, one of which is shown empty while the other is shown with the ballot case 24 therein. Each of the receiving cavities will have a suitable registry slot such as 230 and 232 which will cooperate with orientation lug 66 of the ballot case. As shown, the slots may be of various sizes and shapes in order to receive a matching ballot case therein, and thereby prevent the precinct worker from improperly inserting a ballot case in the console cavity.

It is understood that FIGURE 13 is descriptive of only those elements within the vote registering console for cooperation with one half of the ballot case and that a substantially mere image of the elements will serve the other half and the same for each of the other cavities.

The cavity 31 consists of four corner blocks 233 for guiding the ballot case therein. The sides of the cavity, adjacent the cover of the ballot case, comprises a registry and back up plate 234 which has openings 236 therethrough and which are in coaxial alignment with openings 72 and 73 of the ballot case. At least two alignment and tapered pins 238 extend towards the case cover in coaxial alignment with openings 48 and 50 (the latter not seen) of the ballot case. Immediately spaced behind the registry and back-up plate the vote recording assembly comprising a sensing pin lock-up plate 240 which likewise includes a multiplicity of vertically aligned locking slots 242 which are in vertical alignment with the sensing openings 236 in the registry and back-up plate 234. The lock-up plate is adapted for movement in two horizontal directions, 90° to each other. That is, the lock-up plate 240 is adapted for horizontal movement with sensing pin jig 244 in the direction of the registry and back-up plate, and in addition can move in a horizontal movement transverse to the jig movement so as to serve as sensing pin locks, hereafter described. The jig 244 includes key slotted holes 250 in coaxial alignment with those in the registry and back-up plate, and ballot case. The sensing pin jig 244 includes the tally counter modular matrix 246 into which the tally counters 252 are inserted. The tally counters are of standard commercial type and are adapted to be positioned within the modular matrices 247 at corresponding and equivalent ballot selector positions. A conventional push cable 254 is adapted to have one end plugged into the tally counter 252 while the other end terminates in a sensing pin which extends through jig opening 254, locking plate opening 242 and partially into registry and back-up plate opening 236 prior to its transverse movement as explained in the operation hereof.

Precision slides bearings formed as a part of the assembly comprising lock-up plate 240, sensing jig 244 and modulator matrix 246 permit movement along support rods 248, similarly supporting registry and back-up plate 234.

Various linkages and mechanisms are schematically shown in FIGURE 13 for the purpose of describing the operation and function of the vote registering console and are not to be considered as limiting, as other linkages and devices for accomplishing the same function are to be considered within the scope of this invention and are here merely for descriptive purposes.

A is a cam shaft unlocking mechanism 258 which is actuated when the ballot case 24 is properly inserted and in place within its respective cavity 31, against platform 259 and pop up spring 260 (see FIGURES 13, 16, 16A, 17A and 18).

Element B is the registry plate shifting mechanism and includes a bell crank 261 the movement of which is derived through linkage 262 back to a cam actuator hereinafter described. A pin 264 is pivotally attached for movement by the bell crank 261 for guiding movement with respect to an opening 266 in registry and back up plate 234. A coil spring 268 is coaxial about pin 264 and is of sufficient strength to ordinarily move registry and back-up plate 234 in its transverse movement toward the ballot case.

C is a tripping mechanism used in conjunction with the registry plate, and is adapted to unlatch the operating cam shaft lever when the registry and back-up plate 234 is in the proper position as shown in FIGURE 13 which will permit subsequent progressive movement of the cam shaft. Linkage D is adapted to move the vote recording assembly 239 in a direction transverse to the ballot case. At the end of its stroke, by means not shown, the assembly is returned to its normal position as shown in FIGURE 13 and which is properly timed by the operation and design of the cam shaft.

Linkage E is adapted for timed movement of locking plate 240 in a horizontal direction transverse to the movement of the vote recording assembly 254, which effectively locks the extruded sensing pins as described hereafter.

Linkages F, G and H are adapted for sequential or simultaneous movement with the cam shaft for respectively restoring the ballot case grid to its neutral or free position (I). H restores the party vote mechanism to its neutral position by insertion of rod 270 in ballot opening 62. As far as linkages F, G and H are concerned, it is necessary that linkage F operate just prior to linkage G as such F actually unlocks the grid which is restored by G, the full operation of which will be hereinafter described. The party vote restoring mechanism or linkage H, however, may be operated at any time during the ballot case resetting cycle.

Linkage J is primary ballot case lock which includes a latch 280 which is normally spring biased inwardly to a corresponding notch 281 in the ballot case 24. Latch 280 is released by appropriate mechanism at any time after the alignment pins are set preferably at the end of the sensing cycle. Latch 280 and its corresponding linkages are adapted for movement and coordination with the write-in card and ballot case release mechanism which is hereinafter more fully described.

Figure 14:
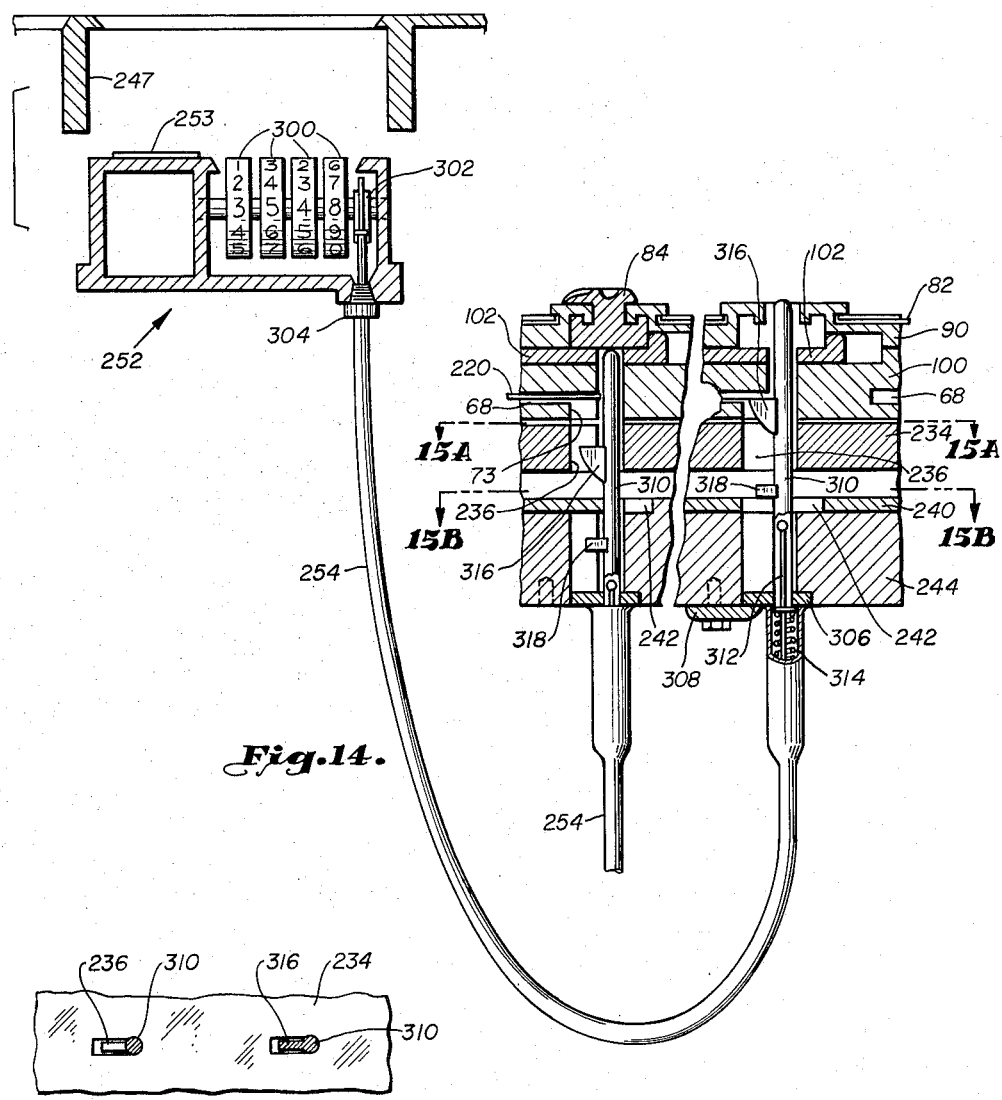
FIGURE 14 is a partial sectional view of the operational relationship of the vote registering console mechanisms with respect to the ballot case selection indicator mechanisms.
Figure 15A:
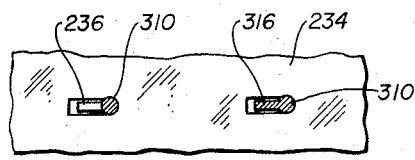
FIGURES 15A and 15B are sectional views taken along the lines 15A—15A and 15B—15B of FIGURES 14.
Figure 15B:
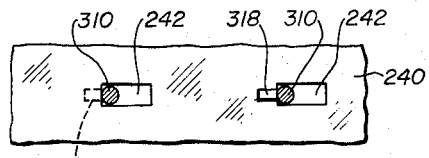

In FIGURES 14 and 15 the relationship of the vote registering components with respect to the ballot case are shown in the final registering position. Tally counter 252 includes digit wheels 300 driven by ratchet mechanism 302 as push cable 254 is actuated. The counter includes conventional attachment 304 for cable 254 at its driven end while the other driving end 306 is retained in sensing pin jig 244 by a vertical retainer strip 308.

Sensing pins 310 are readily attached to the push cable wire 312 which is normally biased in one position by return spring 314. A write-in card marking die 316 is attached to the sensing pin for movement in registry and back plate sampling slots 236 and in ballot case sampling slots 73 as the situation may be. Sensing pin locking lug 318 is likewise attached to act as a back-up in cooperation with lock-up plate 240 during its movement.

Figure 16:
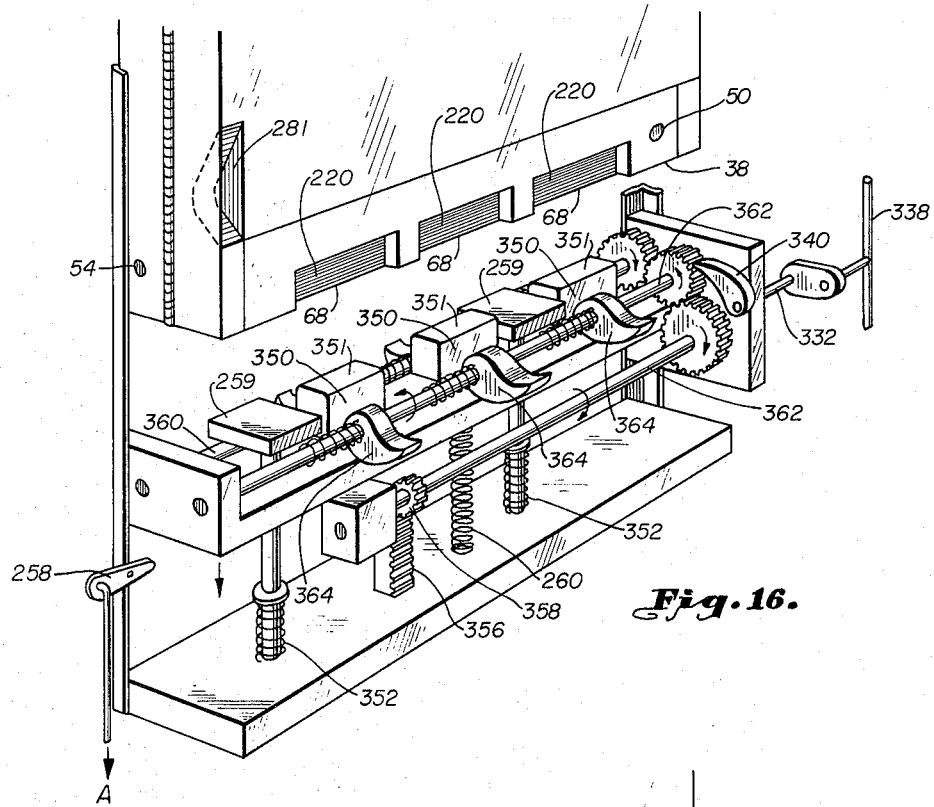
FIGURES 16 and 17 are perspective views of the ballot case and write-in card management control in the vote registering console.

In FIGURE 16 the relative position of the ballot case management controls in the console 30 are shown schematically with respect to the ballot case just entering the cavity. Write-in card extraction control pawl 330 (FIG. 16A) is pivotal about shaft 332. Compression spring 334 normally maintains pawl 330 in the position shown through opening 336 so as to be contacted by the ballot case when inserted. Rod 338 connects to ratchet pawl 340 and thence to bell crank 342. Rod 344 from bell crank 342 actuates the overriding latch 346 which operates in conjunction with the ballot case locking mechanism during the cyclic operation of the registering console control.

At the lower end of the cavity 31 are appropriate write-in card back-up blocks 350 which mate within the castellated openings at the lower end of the ballot case (see FIG. 2) in such a manner that the blocks slide between write-in cards of adjacent frame halves 36 and 38. As such, the blocks provide a back-up for extracting the write-in cards. The blocks operate against compression springs 352. Attached to at least one block are spaced rack gears 354 and 356 to cooperate with spur gears 358 which rotate shafts 360 and 362. Extraction fingers 364 and 366 are spring clutched to shafts 360 and 362 respectively, and are retained in locked position by pawl 340 which cooperates with a ratchet formed either as a part of the fingers 364 or perhaps with the racks 354 or 356 or perhaps with spur gear 358 as desired. The purpose being to retain the extraction fingers against the write-in cards which are sandwiched between the fingers and the back-up blocks 350.

The primary ballot case locking mechanism, including latch 280, includes overriding mechanism 368 which is operated by linkage J which in turn operates in timed conjunction with the vote registering lever 32.

Figure 17:
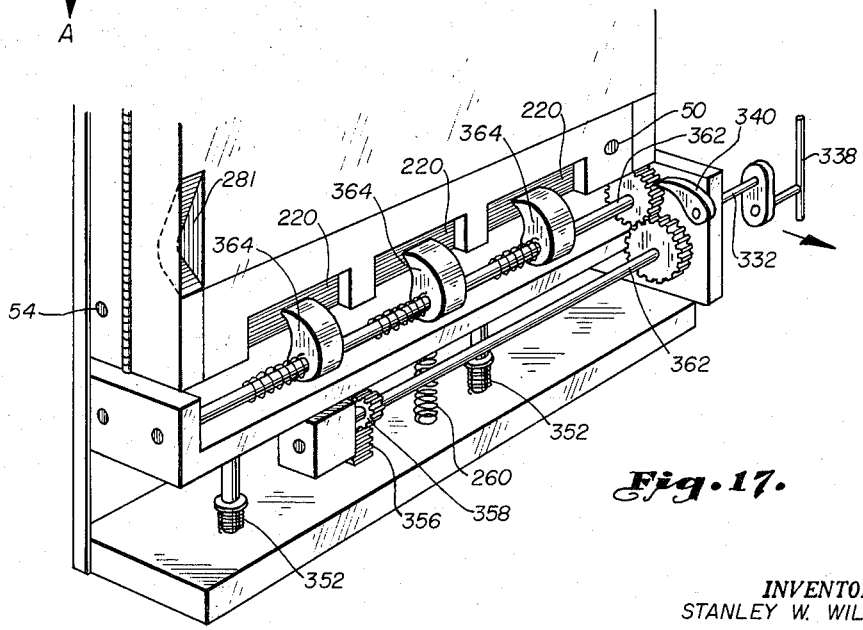

FIGURE 17 describes the relationship of the above described mechanisms when the ballot case 24 is locked within the cavity 31 just subsequent to the withdrawal of the sensing pins or at any time just preceding the end of the vote registering operation. Actually the latch 280 can be removed from operation at any time after the alignment pins have entered the ballot case. In the event of failure of the alignment pins to properly seat with respect to the ballot case means, not shown, such as a key is provided to release the latch 280 and remove the case.

Figure 18:
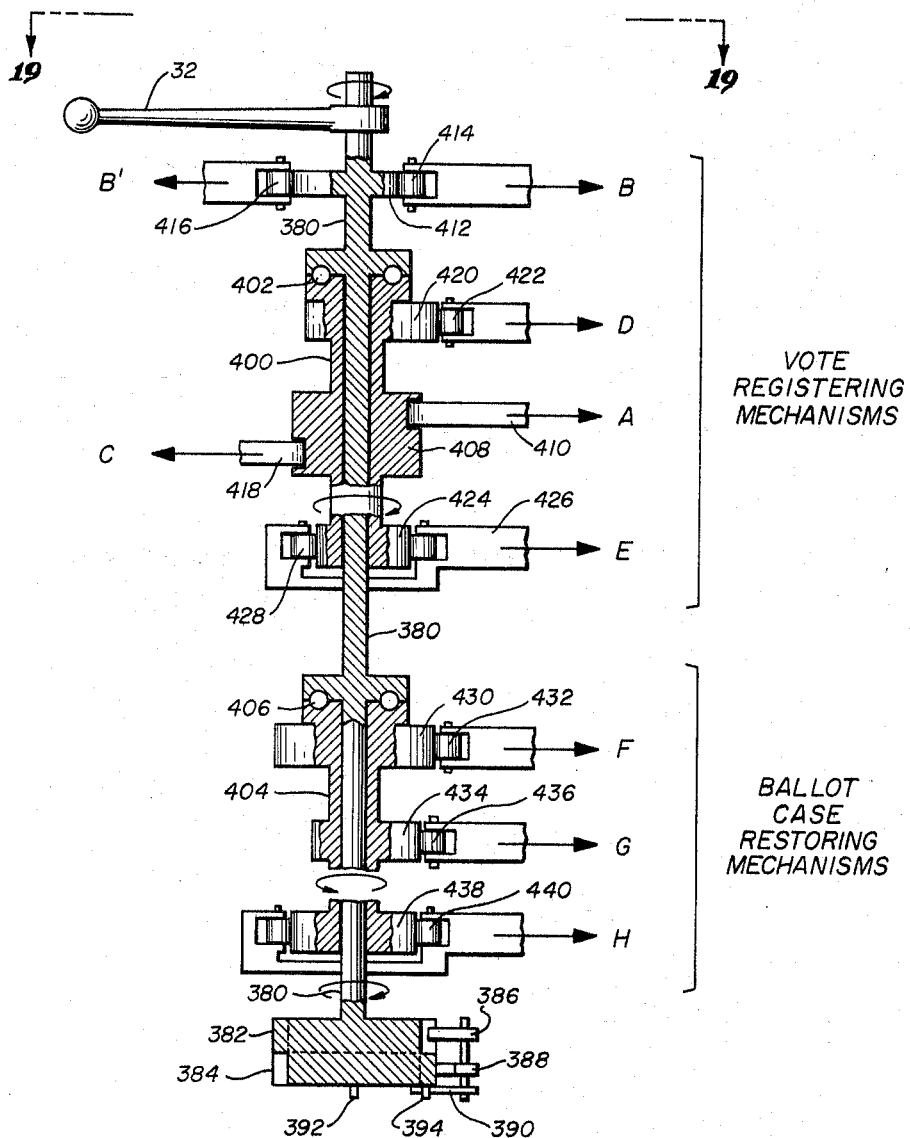
FIGURE 18 is a schematic view of the various control lever sequence mechanisms of the vote registering console.

In FIGURE 18 the control lever sequences are schematically shown associated with vote registering console control lever 32 which is keyed to common shaft 380. A two-way commitment clutch attached to or made a part of shaft 380 includes a clockwise and counterclockwise clutches 382 and 384 the motion of which is controlled by pawls 386 and 388. The pawls are activated by an over-center flip-flop member 390 actuated by arcuately spaced pins 392 and 394.

First cam sleeve 400 is clutched in one direction to shaft 380 as schematically shown at 402. Lever 32 is considered for the purposes of this description to be in the start position and is rotated 90° in an upward direction or clockwise as shown by the arrows. Sleeve 400 therefore, will rotate only clockwise with shaft 380. Second cam sleeve 404 is similarly clutched at 406 but for rotation in a counterclockwise direction with shaft 380 during its return cycle.

The rotation of lever 32 is generally considered herein as follows, two cycle:

Clockwise—ballot case restoring cycle
Counterclockwise—vote registering cycle

First cam sleeve 400 includes, as schematically shown, cam 408 which is unlocked by bolt 410 upon motion A in FIGURE 13 when the ballot case has been properly inserted in cavity 31.

Registry and back plate shifting mechanism is operated by a timed profile cam 412 which causes cam follower 414 to operate linkage motion B of FIGURE 13. Return motion B' is achieved positively by cam follower 416. In that instance there is improper movement of registry and back-up plate 234 or a mismatching of the ballot case alignment pins will not permit motion C to withdraw overriding lug 418 which stops further movement of lever 32. Similarly the two way clutches 382 and 384 are not operative until and unless lug 418 is withdrawn. This means that lever 32 can be rocked to seek out positive alignment of the ballot case 24 in the console.

Upon release of lug 418 the clockwise movement of sleeve 400 is clutched through element 402 with shaft 380. Cam 420 operates follower 422 to provide motion D of FIGURE 13. The return motion D is spring loaded with respect to the console frame.

In timed relationship therewith cam 424 and followers 426 and 428 cause motion E for the sensing pin lock-up plate 240.

At the end of the clockwise motion of lever 32, the return counterclockwise motion of lever 32 and shaft 380 is clutched with sleeve 404. Cam 430 and follower 432 provide motion F which causes moves shaft 140 upwards releasing pawl 170 from tooth 172.

In timed sequence after motion F, cam 434 and follower 436 cause pins 438 and 439 to actuate grid restoring pins 142 and 144 of the ballot case respectively as shown by motion G, with restoration by a companion follower or a return spring.

The party vote mechanism restoration motion H occurs by rotation of cam 438 with respect to follower 440 with return by a companion follower or a return spring.

Figure 19A:
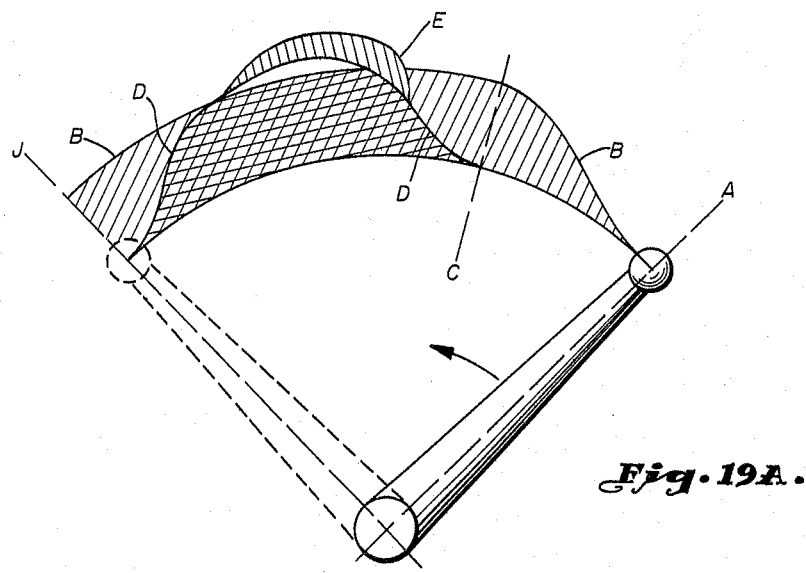
FIGURES 19A and 19B are functional diagrams of the operational sequences performed by the vote registering console control lever in the vote registering cycle and the ballot case restoring cycle respectively.
Figure 19B:
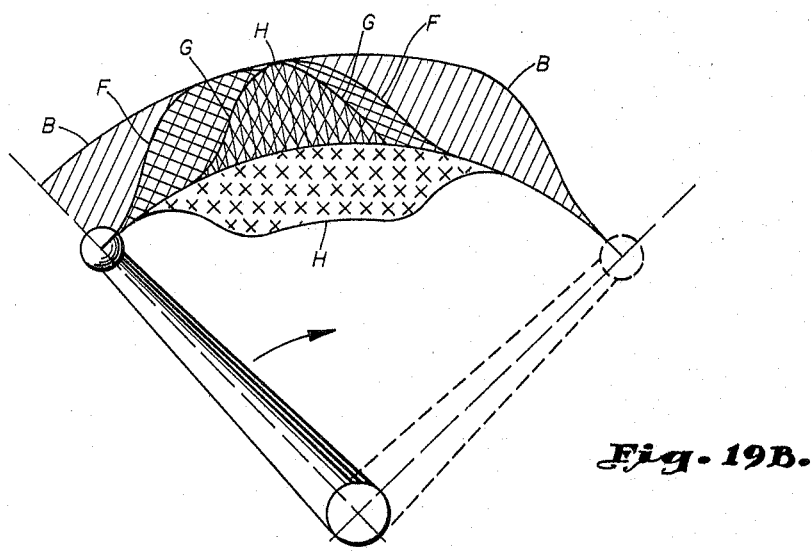

FIGURE 19A is a timing diagram for the operational sequences of the vote registering cycle whereas FIGURE 19B is the ballot case restoring cycle operational sequences.

*Programming the ballot case*

After an election has been declared, it becomes necessary to prepare the ballot cases and vote registry consoles in accordance with the various ballot titles and slates and any other peculiar requirements of the election. Reference is now made to FIGURES 3 through 7. To clear the ballot case 24 it becomes necessary to first remove frame end members 76 and 78 respectively. In so doing, the ends of the ballot strip channels and the selector key grooves are exposed. This permits withdrawal of the previously used printed ballots and any protective covers associated therewith. The removal of the ballots exposes the ends of selector key stops 210 which can then be lifted from their retaining slots 211 from a position blocking the key groove. Upon the removal of the selector key stop members 210 the selector keys 84 can then be removed from their grooves by sliding towards the end from which the frame end members 76 and 78 have been removed.

If there is no necessity of a party vote mechanism, this is inactivated and an appropriate cover 86 (FIG. 3) is placed over the opening normally having the party vote lever. In some instances the party vote lever and associated mechanisms will not be part of the ballot case, as in States whose laws do not provide.

To program the ballot case, and referring to FIGURE 3 as an example, pre-prepared and printed ballots 80, 81, and 82 are positioned first alongside the channel in which it will be later inserted in order to determine the appropriate numerical row groups which will isolate a given ballot title by inserting selector key stops 210 with the appropriate number of selector keys for a given ballot title. Beginning at the top of each column each ballot title is then sequentially isolated by stops 210 with the appropriate number of key or keys 84 movable therebetween.

In programming and printing the complete ballot display, when straight ticket or party voting is permitted the printed names of candidates of the same party should be aligned horizontally from column to column such that gang movement of the keys 84 by the party vote lever 186 (hereafter described) will place the keys opposite all of the candidates of the same party. It should be understood that the ballot display of FIGURE 3 is a composite display of various and sundry ballot titles and does not represent a typical programing for straight ticket voting. The ballots are then inserted within their appropriate grooves or channels, e.g., D, E or F which may include protective transparent cover strips over each ballot. The insertion of each of the ballots in this manner acts as a lock to retain selector key stops 210. Thereafter ballot case end members 76 and 78 are replaced to effectively lock and seal the ballots and selector keys in the programed positions.

In that instance, State laws provide for write-in voting, it becomes necessary to properly prepare write-in ballot cards 220 (FIG. 11) which will be printed with the appropriate sequentially numerical lined rows corresponding to those on the ballots and ballot case. Provision is made for printing the date of the election, the precinct number along with space for the voter to identify the column in the ballot case in which it will be utilized, e.g., column E or F.

A properly designed orientation lug 66 is attached to one or both of the ballot case end members 76 and/or 78 to properly code the particular programed ballot case for its own vote registering means in console 30. This assures that the ballot cases are only utilized within their mating console and cavity and in no others which might be differently programed, e.g., those programed for a specific party as in a primary election. Such coding permits ballot name rotation between precincts where required by law.

Once the ballot case 24 has been properly programmed, inspected and tested it is then closed and locked by movement of lever 44 ready for use as hereafter described.

Programing the vote registering console

The vote registry console is programed to correspond with assigned and oriented ballot case or cases. Referring now to FIGURES 13 and 14, the sensing pin ends of push cables 254 are appropriately inserted and locked to sensing pin jig 244 by end retainers 308. These sensing pin and push cables are positioned in vertical alignment corresponding to the coordinate positions of the programed ballot case. For example, referring to column D of FIGURE 3, sensing pins and push cables will be attached to corresponding row positions on jig 244 D–20 and 21 and D–24, 25 and 26 and D–28 and D–29. The other end of the push cables 254 are appropriately attached to tally counters 252 which are likewise identified with the respective coordinate positions on indicator tab 253. For the purposes of double checking the coordinate positions of the sensing pins, push cables and tally counters, means can be provided with respect to sensing pin jig 244 to permit the insertion of an identical ballot such as used in the corresponding ballot case half. Ballot case orientation openings 230 and 232, as shown in FIGURE 13 may be provided for ballot case orientation lug 66 as in this specific example.

An alternate and somewhat simplified programing of the vote registering console occurs if sensing pins and cables are permanently provided for each and all ballot case selecting positions. The cables would terminate at the counter modules 247. Programing then would comprise plugging in appropriate tally counters 252 for corresponding programed selector positions in the ballot case.

Thereafter, the programed ballot cases and matching console are assigned to voting precincts after inspection and certification by the election officials. As such, a plurality of matching ballot cases 24, all programed identical may be provided for a given and properly oriented console cavity 31 to permit several voters to vote simultaneously.

Ballot case operation

In the operation of this invention, a properly registered and certified voter is assigned a properly identified ballot case 24 by the precinct officials. This means, that in those elections where there will be different ballots for different voter qualifications, properly identified ballot case or cases will be assigned to each voter.

Each ballot case may contain at least one independent, complete and unique ballot. For example, in a primary election separate ballot cases may be prepared for each party, and properly identified as such, whereby the voter is given only that ballot case or cases pertinent to his qualifications. Further, it is possible to divide the ballots in each ballot case to local, state and national levels. The ballot cases can be properly identified either by labels, color coding, serial numbers or other means which can be registered by the precinct officials to the assigned voter. The voter then takes his ballot case or cases to the voting booth 26 each of which are normally provided with selector key stylus 27 and write-in cards and pencils if necessary as provided by law.

When the voter receives the closed ballot case the selector keys and grid mechanism will be in the heretofore described position I. That is, the relative position of grid 102 and selector keys 84 will be in a neutral position, which is the position they were left after being removed from the vote registering console 30. In this position there is complete freedom of key movement with all evidence of the prior vote condition destroyed.

The voter unlatches ballot case 24 by lifting lever 44 which swings about pivot point 46 within the ballot case. At the completion of this motion, follower pin 150 drops off cam surface 148 into recess 151 which locks lever 44 in the open position as shown in FIGURE 4. The movement of pin 150, because of the bias of spring 152, operates bell crank 156 clockwise about its pivot 158 which in turn moves locking bar 162 upward. This permits release of locking lugs 86 and 87 in ballot case half 38 (FIG. 3) from lock openings 88 and 89 in ballot case half 36 (FIG. 4).

Simultaneously with the movement of lever 44, linkage rod 166, which is pivoted to lever 44 at 164, rotates crank arm 168 and shaft 140. This motion rocks pawl assembly 170A and 170B (FIGURES 5 and 6) whereby its engagement with tooth 172 of grid header 138 moves same to position II as shown in FIGURE 6, which is the voter selecting position. This same movement provides parallel action to grid 102 by reason of rack and pinions 134 and 136, or by other means known in the art. With the movement of header 138, rack 208 (FIG. 4) moves spur gear 92 (FIG. 3) which is interposed to move header 105 of the mating ballot case half. The two halves are shifted together to position II ready for voter selection.

Once the lever arm 44 is raised to the up position shown in FIG. 4, the arm cannot be restored to its down position except by unlatching finger latch 154. The book can now be opened to display the ballots. Once lugs 86 and 87 are withdrawn from locking bar slots 88 and 89, interference element 180 is free to move upward by spring force 182. In so doing, element 180 interferes with the horizontal motion of pin 150 which retains lever 44 in a locked position.

With the halves of the ballot case open in the voting booth, the voter is presented with a ballot display which is comparable to a conventional paper ballot, the prime distinction being, that instead of a square upon a paper ballot within which to place a mark or "X" the voter may select, by moving selector keys 84 to a position opposite and in line the names or items of his choosing.

When the vote selecting keys 84 are in the selecting position II of the embodiment of FIGURE 6, soft iron armature elements 126 which are embedded in grid 102 are now positioned in vertical alignment under the selector key magnets 215, for each row. Selector keys are thereby detented with respect to each row position by reason of magnet 215 embedded within the key contiguous to armature 126. As such, selector keys 84 can be easily slid by the voter from one detented position to another by overcoming the attractive force between the magnet 215 and a given soft iron armature 126 for each row position provided.

Because of the compactness of the ballot display system and to facilitate the movement of selector keys 84 a stylus 27 which is provided at each voting booth is inserted within opening 216 of each selector key to assist in its movement to the voters choice.

An alternate detenting system for selector key management control is described in FIGURES 8, 9 and 10. As such, this means provides a design wherein it will be impossible to move or have a selector key 84 in a position between rows. This action is best described in FIGURE 9 wherein movement of the selector key 84 deflects a comb tooth element 122A in such a manner that once selector key 84 has overridden tooth 122A, will snap back to its normal position between rows and force the key or keys to the next row. Hence, selector keys 84 will not occupy an intermediate or unstable position between two selecting points or rows.

In a typical situation the ballot display is preferably such that the ballot title will occupy the top row or rows for that particular section. Directly below will be a listing of the candidates, one for each row and if so provided by law, row or rows for write-in voting, hereafter described. The required number of selector key or keys 84 will normally be found at the bottom of each ballot title section in a neutral row or rows. In some instances these rows may be utilized for write-in certification. An important feature of this invention utilizes normal experience to read from top to bottom thereby normally tending to assure that the voter will peruse all of the candidates or issues prior to moving the selector key or keys upward from their bottomed position. Such arrangement permits a natural mode of selection by the voter in the instance where more than one candidate is to be selected such as shown in Column F in ballot display 82 of FIGURE 3. Here the voter will normally peruse the list from top to bottom as stated, and in his selecting process the topmost key will be moved upward to the voter's initial choice or uppermost selection, while the other keys will then follow in order down the list. This in and of itself, tends to minimize key shuffling and also the advantage of a candidate's name at the top of the list which occurs when using paper ballots or many conventional voting machines, and hence may eliminate the necessity of laws requiring name rotation.

*Straight ticket voting*

The ballot case of this invention is provided with means for straight ticket or party voting which may be permitted by law in some States. Generally speaking, to accomplish this objective, the candidate names are aligned by rows to the same party affiliation. By an appropriate mechanism, hereafter described, all of the selection indicators are moved simultaneously together from row to row until positioned opposite those candidates of the same party affiliation of the voters choice.

Specifically this is accomplished by vertically shifting grid 102 within the ballot case which, because of the detenting action heretofore described, will move the selection indicators therewith. Referring to FIGURES 4, 12A and 12B, this movement occurs by raising lever 186 from its position, as shown, in the right hand margin of the ballot case. This movement causes the vertical shifting of grid 102 by reason of the engagement of pawl 192 with lug 191 attached to the bottom of grid 102. Roller 200, attached by appropriate means to grid 102 cooperates with detented grooves 198 such that the movement of grid 102 is moved one space for each detent equivalent to one party. As the grid is moved by the party vote lever 186, the voter will be able to see either by a separate indicator associated with the party voting lever, or by the movement of the keys or indicators, the progression from party to party until the party of his choice is reached. As the grid moves vertically, spur gear 203 operates to move restoring rack element 204 in an opposite direction downwardly which is to be utilized in the restoration of the grid 102 within the vote registering console and as hereafter described. Once the keys are aligned to the voters party choice, lever 186 is reversed to its position flush with the ballot case. Even though the voter has used the party vote lever to align the selector keys opposite candidates of the same party the selector keys or indicators 84 are still free to be moved by the voter in that instance any particular changes are desired for any or all of the ballot titles.

It is preferred that by instruction, or otherwise, the voter operate the party vote lever prior to making any other selections.

*Write-in voting*

For those States that so permit by law, write-in voting may be accomplished using the ballot case of this invention by using write-in cards similar to that shown in FIGURE 11, which will be available at each voting booth. This card is a duplicate in size and format to each column of each ballot case. The card 220 is simply a blank ballot with each row numerically identified to correspond with each numbered row of the ballot case. The card is of sufficient stiffness such as that found in show card stock. In the preparation of the write-in card, the precinct number, the date of the election and a space provided for identifying particular ballot case and column in which the write-in card is to be used is conveniently provided. In using the card, the voter will place the card alongside the ballot in which he wishes to substitute a name other than those already provided. Certain rows of the ballot will be so identified for write-in purposes. The voter will then write-in those names on such corresponding numerical rows identified on the write-in card. Certification of the voters write-in name is, in order to have it properly counted, requires that a selector key 84 be positioned opposite the write-in row or rows in which the names have been written. Thereafter, the write-in card is inserted in slot 62, so provided in each ballot case half, until it stops, or until the marking 221 registers with the bottom of the case. In that instance the voter fails to insert the card its full depth, provision is made in the vote registry console to slide the card into place. In the event the voter should change his mind as to the write-in candidate, or desires to write-in other candidates, the card can be removed and the above procedure repeated. In that instance, there is a further change of mind and it is later desired to cancel the write-in candidate, this is accomplished by either removing and destroying the write-in card or by simply moving selector key 84 from its heretofore selected write-in position to a position opposite a named candidate, or to a neutral position, if desired.

To assure further certification of this write-in card, the voter must identify the column to which the write-in ballot is to be used by writing the column letter or other identification thereon in the space so provided.

When the voter is certain that he has positioned those selector keys opposite those candidates he desires to be elected, the ballot case halves are then brought together and closed. In so closing, lugs 86 and 87 cause interference element 180 to move downwardly and hence permit locking of the ballot case. Locking of the ballot case occurs by moving finger release 154 to the left, unlatching lever 44 and permitting its return to a position flush with the top of the case. This same movement through the heretofore described linkage 166, crank arm 168 and pawls 170A and 170B cooperate with tooth 173 of header 138 for movement and shifting of grid 102 to its far left or position III where the selector keys are locked in their selected positions.

Because of the arrangement of pawls 170A and 170B with respect to the corresponding teeth 173 and 174 any further shifting or movement of grid 102 is prevented. Such further movement occurs by reason of the fact that grid 102 is against a stop. This same movement of header 138 is transferred to the other ballot case half by reason of the cooperative engagement of rack 208 with respect to spur gear 92 as heretofore described. Because the grid 102 and header 138 are at the end of their movement to the left, it is now impossible to raise lever 44 and reopen the ballot case.

Provision can be made, as a modification of this invention wherein movement of header 138 and/or grid 102 will supply a visual signal or indication as to whether the ballot case is ready for use by a voter, or whether it has already been used by a voter and has not been processed through the vote registering console. For example, a green marker could indicate the ballot case is ready for use whereas a red marker would indicate that the ballot case has already been used and is ready to be processed through the vote registering console.

The voter returns the ballot case to the precinct officials for registration of the voters selections. In so doing, the precinct officials, or in some instances, provision may be made for the voter to register his own selection, by inserting the ballot case within the proper pre-coded cavity 31, which shall be the only one which shall receive it. The ballot case is then inserted and pushed downwardly within cavity 31 of the vote registering console wherein it is latched in position. The precinct official, or the voter, as the case may be, then grasps vote registering lever 32 and pulls same until the end of the first stroke and then pushed back to its original starting position. When this position is reached, the ballot case "pops up" to be partially exposed out of the vote registering console cavity 31. The ballot case is now in condition ready for reuse by another voter. Although a manually operated vote registering lever 32 is shown in and described in this embodiment, it is to be understood that provision can be made wherein the vote registering occurs by an electrical actuation system immediately after the ballot case has been properly inserted within its cavity. It is further understood that one or more ballot cases can be processed by one vote registry console simultaneously.

Figures 16A, 17A:
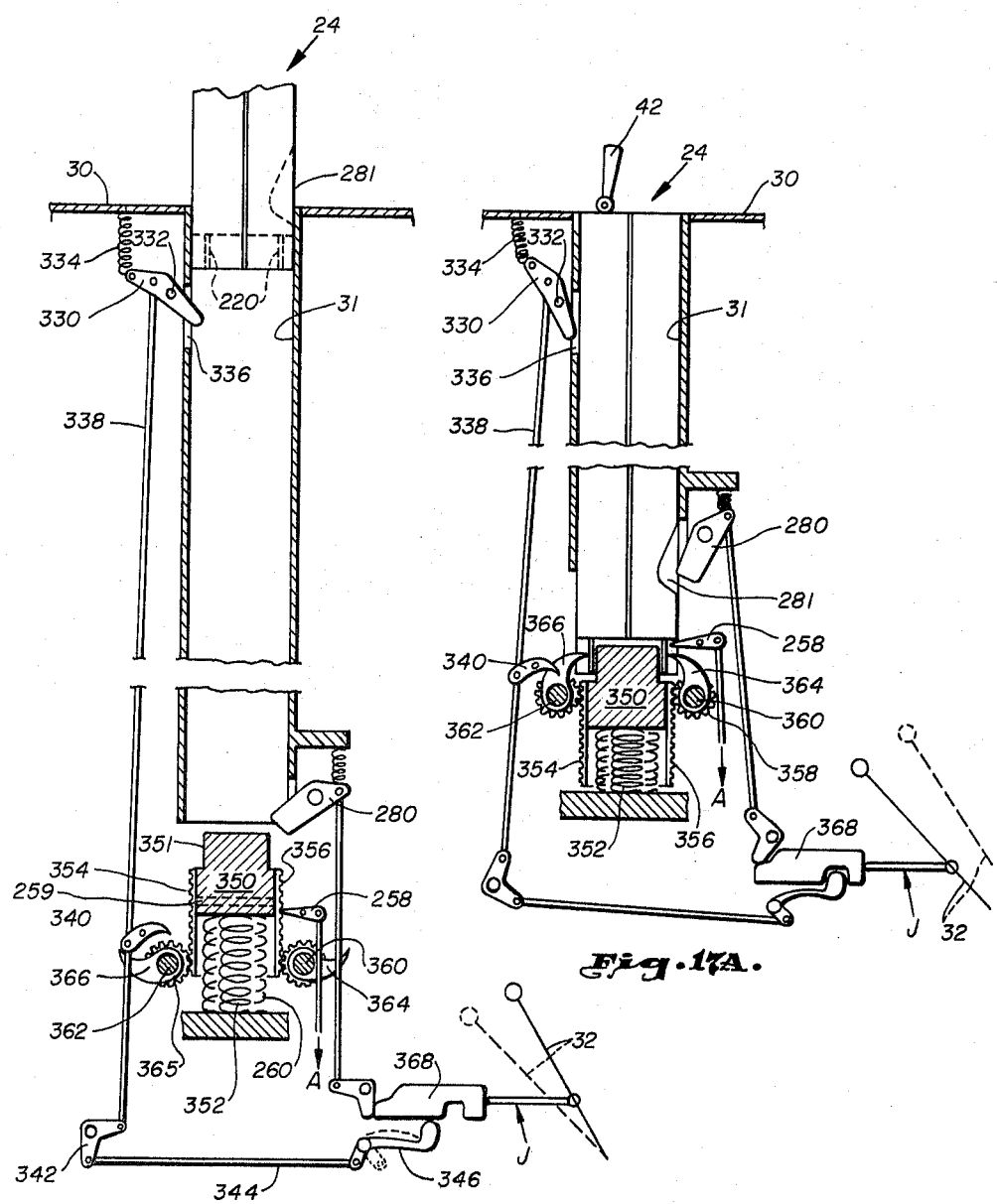
FIGURES 16A and 17A are end views of further ballot case management control mechanism within the vote registering console.

As the ballot case is inserted within cavity 31, if so oriented and coded properly, the mechanism of the ballot case latching and unlatching system is essentially that shown in FIGURES 16 and 16A which is the position of the mechanism after removal of the preceding ballot case from cavity 31. As such, insertion of ballot case 24 downwardly pivots write-in card extraction control pawls 330 about pivot 332 in a clockwise direction. This moves rod 338 and ratchet pawl 340 into engagement with the ratchet teeth 365 of extraction finger control mechanism. The book is further inserted until abutment with write-in card back-up blocks 350 which are received within the castellated openings of the bottom of the ballot case 24. The write-in cards, if any, are adapted to position themselves on opposite sides of blocks 350 which acts as a back-up for the extraction fingers. Further movement downward causes abutment of the ballot case against blocks 350, which by reason of racks 354 and 356 cooperating with spur gears 358 attached to shafts 360 and 362 rotates extraction fingers 366 and 364 inwardly towards back-up blocks 350 to squeeze against write-in cards 220. The extraction fingers 364 and 366 are held in such position by reason of ratchet pawl 340, until released upon removal of ballot case 24 from its cavity 31. Shafts 360 and 362, by reason of a wind up spring are adapted to spring load the ratchet and pawl system in order that same will retain this position until the ballot case has been released. A spring, not shown, is adapted between the ratchet 365 and shaft so as to permit over travel of ballot case movement downwardly which will only increase the tension of extraction fingers 364 and 366 against the write-in cards. The downward movement of block 350 is resisted by compressional spring 352 which acts as a restoring spring for the write-in card release mechanism. In addition, portions of the ballot case 24 abut against pop up spring platform 259 which likewise is spring loaded at 260 which may be best described by reference to FIGURE 17A.

Just prior to homing of the book within the cavity 31 cam shaft and locking mechanism 258 which is further represented by motion A is actuated which unlocks the vote registering lever 32. Homing or latching of the book within cavity 31 actually occurs when latch 280 enters sear mating lock 281 in the ballot case 24. In this position, the ballot case is securely locked within the console cavity 31 and cannot be removed until the vote registering and restoring cycle is completed.

*Vote registering cycle*

Motion A has removed bolt lock 410 from its recess normally locking the motion of lever 32, permitting actuation of the vote registering cycle. Rotary rotational motion movement of shaft 380 by movement of lever 32 begins motion B which corresponds with movement of the vote registry and back-up plates 234, on each side of ballot case 24, inwardly towards each other. After a prescribed angular movement of rotation of shaft 380, e.g., from A to C in FIG. 19A if alignment pins 238 have been properly seated in the ballot case 24 this permits the bell crank related to motion C to drop up in abutment against vote registry and back-up plates 234. With motion C releasing secondary lock 418 and hence permitting further rotational movement of shaft 380 through the remainder of the vote registering and restoring cycles. Unless this action occurs, i.e., the removal of secondary locking lug 418 there can be no further movement of shaft 380 through the vote registering cycle. This usually means that the vote registry and back-up plate 234 and/or its alignment pins have not properly seated themselves with respect to the ballot case 24. This assures that the ballot case will be properly aligned within the vote registering console with respect to the vote registry sensing pins and other related mechanism before the vote registry lever can be operated through the complete cycle. Because of the double acting one way clutches 382 and 384, heretofore described, which are timed for operative sequence after the secondary lock has been removed, commits the motion of lever 32 to a complete cycle.

Thereafter, further rotary movement of shaft 380 by lever 32 causes motion B to take place which is operative to move vote recording assembly 239 toward the vote registering back-up plate 234. Before this movement, it is noted that the sensing pins 310 are recessed behind lock-up plate 240 and within sensing pin jig 244 so as not to be exposed. In the inactive position of the vote registry console mechanism, the ends of sensing pins 310 are flush with the inside surface of vote registering and back-up plate 234 and thus do not protrude into the cavity 31 for safety reasons. After movements B and C, the ends of the sensing pins 310, which is the first independent movement of the vote registering cycle, the ends of sensing pins 310 are withdrawn, not more than the amount of movement of the vote registry and back-up plate.

By reason of motion D the vote recording assembly 239 is moved in the direction of the ballot case 24. The length of movement or travel is such that the sensing pins 310 will enter the ballot case openings 72 to the positions shown in FIG. 14, where in one case a selector key 84 is encountered and in another case there is no key. In the former case the continued relative motion of the assembly 239 toward the fixed ballot case 24 causes pin 210 to back up relative to its push cable sheath 254, which progresses the tally counter 252 unit wheel one number. In the latter position where pin 210 does not encounter a key 84 there is essentially no relative movement and thereby no action on its respective tally counter.

In the event write-in voting is permitted sensing pins 310 are provided with marking dies 316 which move within slots 236 of registry and back-up plate 234 and also within slots 73 of the ballot case. In operation the marking die 316 contacts the write-in card 220 margin before the end of the sensing pin travel. This marking occurs only at those rows where there are no selector keys (see FIGURE 11). In order to provide sufficient pressure on the die and effect a mark, it is necessary to solidly back-up the sensing pin movement, yet not permit actuation of the respective counter. This occurs in timed sequence of motion E on the diagram which is at that point when lug 318 or pin 310 has moved through slot 242 of the lock up plate 240, at this point the plate 240 is shifted by to provide back-up interference with the return of any backing movement of lug 318. Further motion D applies pressure of the die against the write-in card 220. The back-up plate 240 is returned to its normal position (to the left in FIG. 14) before the sensing pins are withdrawn by reverse motion D of the vote recording assembly. This restoration movement is, in one embodiment, by release of motion D and spring action return or by a reverse cam follower. This completes the vote registering cycle and the cam shaft 280 is now reversed by reverse movement of lever 32. At the end of this first cycle motion J causes overriding latch 346 to lock with mechanism 368 which removes latch 280 from its sear lock 281 in the ballot case. Thus the alignment pins 238 remain to support the case in the console.

During vote registering cycle, one-way clutch 402 was activated to rotate first cam sleeve 400, while second cam sleeve 404 remains inactive by reason of one-way clutch 406.

Clutches 382 and 384 assure complete follow through motion for lever 32 once started in its cycles only after the alignment pins are positioned during the vote registry cycle, and for the ballot case restoring cycle until the pins are withdrawn. Flip-flop member 390 assures this follow through motion, i.e. once the lever is started there is no regression and it must continue through the two basic cycles.

*Ballot case restoring cycle*

The rotation of second cam sleeve 404 is activated, while the first sleeve 400 is now inactive, during this cycle which is represented diagrammatically in FIGURE 19B. Alignment pins 238, represented by motion B, remain seated until the action of rocking cam 412, which is attached to shaft 380, reverses to its starting position.

Sequentially the grid shifting lock mechanism, represented by pawls 170A and B (FIGURES 4 through 7), are unlatched from teeth 173 and 174, by transverse motion vertically which causes the pawls to slide off the ends of the teeth. This occurs by vertical motion F against shaft 140 through opening 60 in the ballot case.

At the completion of this motion actual horizontal shifting of the grid 102 from position III to position I occurs when motion G forces pins 438 and 439 into openings 52 and 54 to engage against pins 142 and 144 which are integral with the grid 102. After movement to position I, the motion F is withdrawn wherein the pawl 170A will return to engagement with the tooth 172 as shown in FIGURE 5, by reason of the spring bias 141. When the grid is restored to position I the detenting support, whether it be magnetic or mechanical, has been removed wherein keys 84 are free to drop to their neutral positions by reason of sufficient design clearances.

If the party voting mechanism has been used, meaning the grid 102 is raised vertically, restoration to its lower position occurs by reason of motion H forcing pin 270 into lower opening 62 of the ballot case. The forces rack 204 vertically upward, rotating spur gear 203 which reverses the motion of grid 102 by reason of rack 128A. This also replaces lug 191 into contact with pawl 192 of the party vote lever. The motion is then released. Motion H can be designed to operate at any time during the restoring cycle.

Upon removal of alignment pins (motion B) the ballot case is detached from the console cavity and by reason of spring loaded platforms 259 the case will "pop-up." The "pop-up" action increases the G-forces applied to the case. The inertia is repelled by the keys 84 inside to assist in their restoration to a neutral position of necessity. This also acts as an indicator to the precinct officials that the case is ready for reuse.

As the case is manually withdrawn, extraction fingers 364 remain tightly locked against blocks 350 between which the write-in cards 220 are held. This withdraws the cards from their slots until the lower end of the ballot case passes control pawl 330 which moves into that position shown in FIGURE 16. This removes ratchet pawl 340 from its ratchet gear on shaft 362. This quickly releases fingers 364 from its gripping position by reason of the cooperative action of spring 260 and the associated rack 356 and pinion 358 motion. The write-in cards are free to fall to the base of the console. Simultaneous with the action of control pawl 330 the overriding latch 346 is removed from mechanism 368 releasing latch 280 to its initial ready position to receive and lock the next inserted ballot case.

At this point both the ballot case an the vote registry console are ready for reuse.

At the end of the voting day the usual safeguards as regards the secrecy and the security of the vote are incorporated with the apparatus of this invention. For example, once the vote registry console door exposing the tally counters is opened, which occurs only at the end of the voting hours by law, the machine is disabled by locking the lever motion from further movement no matter if the cover is replaced.

An alternate modification of this invention includes provision wherein the selector keys 84 are held in a locked position III as long as the case is closed. Opening the case will move the grid to the detented or vote position II. However, provision must be made within the ballot case restoring cycle to return the grid to a neutral position I wherein the keys will return to neutral before being locked in that position.

An important advantage of this voting system is that if for some reason a voter changes his mind or has incompletely selected and has closed and locked the ballot case, his actions are amendable at any time prior to placement in the vote registry console. Attendants and suitable equipment at the precinct permits resetting of the grid to its neutral position I so the case can be reopened. Notation is made by the precinct officials of the cancelled selector cycle corresponding to the sequential number on the ballot case.

While this is a completely mechanical system it is understood that an electrical means can be used to initiate the registry and restoring cycles upon insertion of the ballot case in its cavity. Other certain mechanical actions might, to an advantage, be accomplished by electromechanical means, for example in the extraction and retrieving of the write ballots in the console.

Provision can also be made for isolation of the vote registry console cavities for independent use as required. In addition, the console can be programed to duplex the cavities in that instance where only one ballot frame is required for the election. This obviously doubles the effectiveness of the console. Further, one cavity can be divided between two separate ballots, one to each side which will serve two distinctive ballot programed cases.

This invention has been described with reference to specific and preferred embodiments. It will be apparent, however, that other modifications can be made without departing from the spirit of the invention as set forth in the appended claims.

What is claimed:

1. A reusable voting ballot comprising,
   two frames hinged along one common edge to open and close like a book;
   a lever to latch said frames together when closed and unlatch said frames to permit opening;
   a counter operable to record one digit upon movement of said lever to one of said latched and unlatched positions;
   a plurality of ballot title columns in each of said frames exposed to view only when said frames are in the open position;
   voter selection indicators disposed for movement with respect to each ballot title;
   a selection indicator control grid disposed for movement with respect to said indicators from a first position wherein said indicators are in a free-state, to a second position wherein said indicators are detented for movement to a desired voter selection, said movement to said second position caused by means cooperating with the movement of said lever unlatching said frames, and then to a third position locking said indicators in said voter selection position, said movement to said third position caused by means cooperating with the movement of said lever in latching said frames together, and means retaining said lever in its latched third position.

2. A reusable voting ballot of the type described in claim 1 wherein a slot is provided for each of said ballot title columns to receive a card for write-in voting.

3. A reusable voting ballot of the type described in claim 1 wherein means is provided to move all of said voter selection indicators simultaneously to a common political party designation when said control grid is in said second position.

4. A reusable voting ballot of the type described in claim 1 including a slot for each of said ballot title columns to receive a card for write-in voting and including means to move all of said voter selection indicators simultaneously to a common political party designation when said control grid is in said second position.

5. A reusable voting ballot of the type described in claim 1 including in combination a vote registry console, said console including means to receive and retain said ballot after voting and after said lever has latched said ballot frames;
- means to sense and record the position of said voter selection indicators;
- means to restore said control grid to its said first position;
- means to release said retaining means whereby said lever is operable to unlatch said frames; and
- means to release said ballot from said console.

6. A reusable voting ballot of the type described in claim 5 including a slot for each of said ballot title columns to receive a card for write-in voting,
- means to validate said write-in cards with respect to the position of said selection indicators, and
- means to withdraw and store said write-in cards.

7. A reusable voting ballot of the type described in claim 5 wherein means is provided with said ballot to move all of said voter selection indicators simultaneously to a common political party designation when said control grid is in said second position, and including in said console means to restore said party vote means to its original position.

8. A reusable voting ballot comprising
- a frame including a cover to incase said frame;
- first means to retain said frame and cover together when closed and release said frame and cover;
- at least one ballot title column in said frame exposed to view and accessible for use only when said cover is released;
- indicating means to record an operation of said first means;
- a voter selection indicator disposed for movement with respect to each ballot title; and
- a selection indicator control grid disposed for sequential movement cooperatively with said first means in said frame with respect to said indicator from a first position wherein said indicator is in a free state to a second position wherein said indicator is movable to a detented state at a desired voter selection, and thence to a third position locking said indicator at said voter selection.

9. A reusable voting ballot of the type described in claim 8 wherein a slot is provided for each of said ballot title columns to receive a card for write-in voting.

10. A reusable voting ballot of the type described in claim 8 wherein means is provided to move all of said voter selection indicators simultaneously to a common political party designation when said control grid is in said second position.

11. A reusable voting ballot of the type described in claim 8 including a slot for each of said ballot title columns to receive a card for write-in voting and including means to move all of said voter selection indicators simultaneously to a common political party designation when said control grid is in said second position.

12. A reusable voting ballot of the type described in claim 8 including in combination a vote registry console, said console including means to receive said frame after voting and after said first means has retained said frame and cover closed;
- means to sense and record the position of said voter selection indicators; and
- means to restore said control grid to its said first position.

13. A reusable voting ballot of the type described in claim 12 including a slot for each of said ballot title columns to receive a card for write-in voting,
- means to validate said write-in cards with respect to the position of said selection indicators, and
- means to withdraw and store said write-in cards.

14. A reusable voting ballot of the type described in claim 12 wherein means is provided to move all of said voter selection indicators simultaneously to a common political party designation when said control grid is in said second position, and including in said console means to restore said party vote means to its original position.

15. A reusable voting ballot comprising:
- a coverable frame;
- at least one ballot title column in said frame when exposed to view;
- a voter selection indicator disposed for movement in said frame with respect to each ballot title;
- a selection indicator control grid disposed for sequential movement in said frame with respect to said indicator from a first position wherein said indicator is in a free state to a second position wherein said indicator is movable to a detented state at a desired voter selection, and thence to a third position locking said indicator at said voter selection; and
- means in said frame to move said control grid.

References Cited by the Examiner

UNITED STATES PATENTS 882,160  3/1908  Newcomb _____ 235—56 X

LEO SMILOW, *Primary Examiner.*

C. G. COVELL, *Assistant Examiner.*